May 16, 1967 T. L. KUEBLER ETAL 3,319,438

AUGER ICE MAKER

Filed May 15, 1964

INVENTORS
THOMAS L. KUEBLER
CHARLES E. FREESE
BY
Charles L Lovenhak
attorney

United States Patent Office 3,319,438
Patented May 16, 1967

3,319,438
AUGER ICE MAKER
Thomas L. Kuebler and Charles E. Freese, Erie, Pa., assignors to Uniflow Manufacturing Company, Erie, Pa., a corporation of Pennsylvania
Filed May 15, 1964, Ser. No. 367,666
1 Claim. (Cl. 62—354)

This invention relates generally to ice particle producing machines and constitutes an improvement in previous ice particle producing machines.

Prior ice particle producing machines had a freezing cylinder with refrigeration jackets surrounding the cylinder for freezing ice on the side walls thereof. A rotatable delivery auger was supported in the cylinder. This auger removed the layers of ice from the cylinder wall and carried the ice upward to the discharge end of the cylinder where the ice was discharged by a variety of means of varying quality.

The present invention provides a more efficient means of positively removing the ice from the freezing cylinder and maintaining a smooth flow of ice.

It is, accordingly, an object of the present invention to provide a relatively simple, yet highly efficient ice particle producing machine having a cylindrical freezing chamber with refrigeration means surrounding the major portion of the cylinder and having a liquid source for supplying liquid to be frozen to the cylinder with improved means for positively removing the ice.

Another object of the invention is to provide an ice delivery member for a machine of the class described which is constructed to remove the ice by improved means in a smooth flow and deliver the ice to a discharge chute which may carry the ice into a storage chamber.

A further object of the invention is to provide an ice particle producing machine which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figures 1, 2, 3:
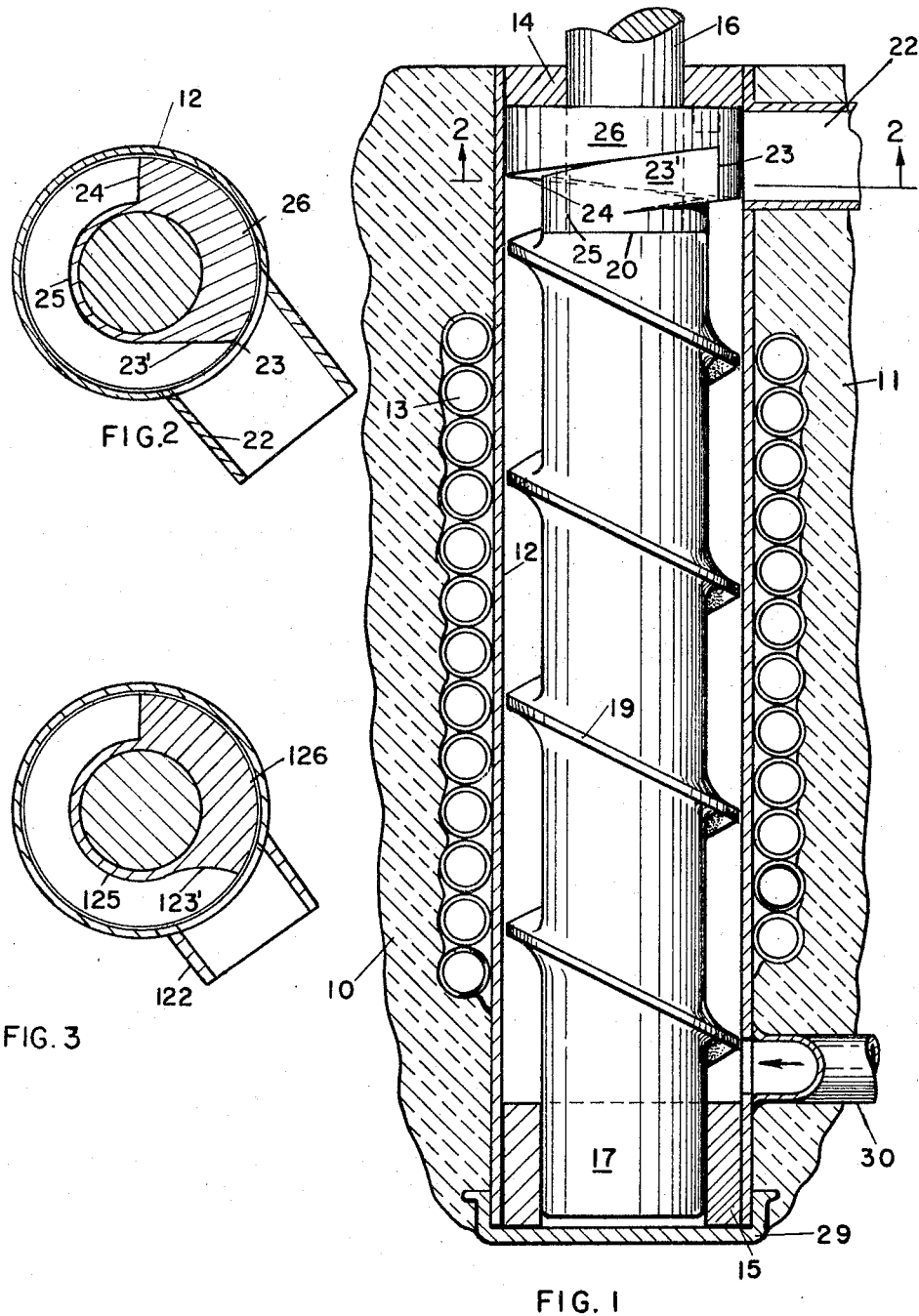
FIG. 1 is a vertical cross sectional view of an ice particle machine according to the invention.
FIG. 2 is a horizontal cross sectional view taken on line 2—2 of FIG. 1.
FIG. 3 is a cross sectional view similar to FIG. 2 of another embodiment of the invention.

Now with more particular reference to the drawing, FIGS. 1 and 2 shown an ice making machine made up generally of a hollow cylinder 12 with an auger 17 therein. Above the auger 17 is a helical member 26 fixed in relation to the cylinder 12 and having a helical ramp 24 facing the auger. The hollow cylinder 12 is supported on the machine by a suitable support and enclosed by insulation material 11. The cylinder 12 has an inlet for water made up of a pipe 30 which communicates with the interior of the hollow cylinder 12.

An outlet for ice particles is made up of a pipe 22. The pipe 22 communicates with the inside of the cylinder 12 through the opening shown. A cooling coil 13 carries a suitable refrigerant which keeps the cylinder 12 at a low temperature to freeze the water in the cylinder.

The helical auger 17 is rotatably supported in the hollow cylinder 12 at its lower end in a bearing 15. The upper end of the auger is supported in the cylinder 12 by a bearing 14 which receives a shaft 16 which is fixedly attached to auger 17 at an end portion 20. A suitable motor or rotating mechanism can be connected to the shaft 16. Both bearings 14 and 15 rotatably support the auger 17 in the hollow cylinder concentric therewith. The bearing 15 is held in place by a cup shaped retainer 29 which also forms a water tight seal at the bottom of the cylinder 12 to prevent leakage.

The auger 17 has a fin 19 thereon shaped in the form of a helix. The fin 19 of the auger fits in the cylinder 12 with a fairly small clearance. The fin may have a clearance of .010 inch, for example, inside the cylinder. The fin removes the ice from the cylinder walls and rotates it as it directs the ice upwardly toward the top.

The lower end surface of the outer periphery of the member 26 is in the form of a helical ramp 24 having a downwardly facing surface starting at the upper end of an edge 23 and extending for approximately one turn around the member 26 and downward and terminating at the lower end of the edge 23 and at the lower edge of a surface 23'. The surface 23' also starts at the edge 23 and terminates at and merges with a cylindrical surface 25. The cylindrical surface 25 at the bottom of the member 26 is approximately the same diameter as the cylindrical portion of the auger 17.

The auger 17 terminates adjacent the bottom of the member 26. The minor diameters of the auger 17 and the member 26 present a smooth cylindrical surface of reasonably constant diameter for ice to flow up and around. The ramp 24 provides a smooth surface for the ice to flow up against as it is rotating upwardly. When the ice reaches the surface 23', it is directed outwardly beyond the edge 23 into the discharge pipe 22.

As the ice is moved up in the cylinder 12, it forms a smoothly spiraling cylinder of ice between the cylinder 12 the the auger 17 along with the surface 25. The ice then takes the form of a ribbon as wide as the edge 23 as it passes the edge 23 and it is deflected outwardly by the surface 23' which also breaks the ice into particles. The shape of the surface 23' will also determine the size of the ice particles.

The ice particle size can be changed by changing the slope and position of the ramp 24 of the member 26. Ice particle size is also related to the position and width of the edge 23 in relation to the opening to the pipe 22. In the same way, particle size and hardness are related to the size of the opening from the cylinder 12. The size of the opening from the cylinder can be readily adjusted to control this particle size to desired limits. As the ice is rotating in a spiral path toward the discharge end of the cylinder 12, the member 26 positively deflects ice out of the opening. Prior machines utilized only the movement of ice parallel to the major axis of the auger to force the ice out of the discharge.

FIG. 3 shows an embodiment of this invention similar to that shown in FIGS. 1 and 2. In this embodiment, a surface 123' is curved, starting on a tangent with a minor diameter 125 of a member 126 and curving toward a direction parallel to the axis of an outlet pipe 122. Ice particle size can be changed by changing the radius of the surface 123'.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

An ice making machine comprising
a hollow, vertically disposed cylinder,
an inlet into said cylinder for liquid adjacent the lower end and an outlet adjacent the upper end for ice particles, refrigeration means on said cylinder for freezing said liquid therein, an auger having a helical fin on the outer periphery thereof rotatably supported in said cylinder with the fin of said auger in closely spaced relation to the inside of said cylinder, said helical fin terminating adjacent said outlet, and a fixed member having a cylindrical portion being of a diameter substantially equal to the minor diameter of said auger and having a downwardly facing, axially extending helical ramp above said cylindrical portion, said helical ramp extending upwardly and around said cylindrical portion in a direction opposite to the direction of said helical fin and having a surface generally tangent to said cylindrical portion joining the starting end and the finish end of said helical ramp whereby the ice moved up rotatably by said auger is deflected generally tangentially out from the axis of said cylindrical portion and through said outlet.

References Cited by the Examiner
UNITED STATES PATENTS

| | | | |
|---|---|---|---|
| 2,753,694 | 7/1956 | Trow et al. | 62—354 X |
| 2,877,632 | 3/1959 | Chaplik et al. | 62—320 |
| 3,126,719 | 3/1964 | Swatsick | 62—320 |
| 3,139,740 | 7/1964 | Swatsick | 62—320 |

ROBERT A. O'LEARY, *Primary Examiner.*

W. E. WAYNER, *Assistant Examiner.*